Nov. 4, 1952  R. H. LONG  2,616,304
TRANSMISSION OPERATING MECHANISM
Filed Dec. 4, 1950  2 SHEETS—SHEET 1

INVENTOR.
RICHARD H. LONG
BY
H. V. Clayton
ATTORNEY

Nov. 4, 1952 R. H. LONG 2,616,304
TRANSMISSION OPERATING MECHANISM
Filed Dec. 4, 1950 2 SHEETS—SHEET 2
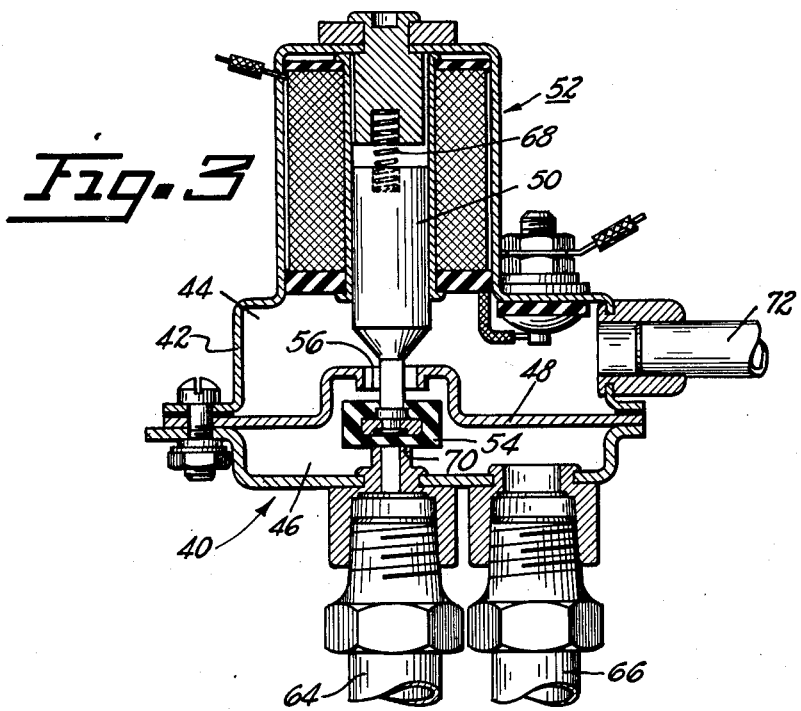
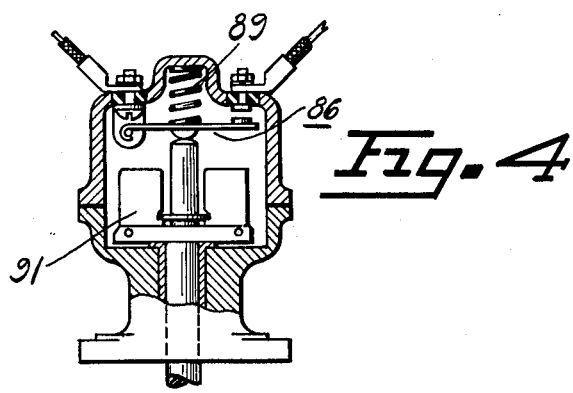
INVENTOR.
RICHARD H. LONG
BY
ATTORNEY Patented Nov. 4, 1952

2,616,304

UNITED STATES PATENT OFFICE 2,616,304

TRANSMISSION OPERATING MECHANISM

Richard H. Long, South Bend, Ind., assignor to Bendix Aviation Corporation, South Bend, Ind., a corporation of Delaware Application December 4, 1950, Serial No. 199,128

6 Claims. (Cl. 74—472)

This invention relates to power actuated mechanisms for selectively moving a control element to one or the other of two operative positions, and more particularly to gear shifting mechanisms for operating the speed changing gearing commonly used in coupling the engine or prime mover with the driving wheels or the like of an automotive vehicle or the propeller of a marine craft.

One of the objects of my invention is to provide a power shifting mechanism for a motor vehicle change speed mechanism, said mechanism being electrically selective under the control of vehicle speed responsive means and engine torque controlling means.

Yet another object of my invention is to provide power means for actuating a two-speed axle transmission mechanism of an automotive vehicle, said power means being operative to shuttle the transmission mechanism between its two settings with an operation of a governor operated switch and an operation of the accelerator of the vehicle. With the mechanism of my invention, an upshift operation of the transmission is automatically effected when the accelerator is released to or beyond a certain position and the vehicle speed is increased to or above a certain factor; and as an additional feature of my invention should the driver desire to effect the low gear setting of the transmission, say to facilitate the passing of a car on the road, he need but depress the accelerator to its wide open throttle position, whereby the mechanism of my invention will operate to establish the transmission in said setting and with the mechanism of my invention a low gear setting may be automatically established by the opening of the aforementioned governor operated switch.

Yet another object of my invention is to provide a mechanism for operating a change speed transmission of an automotive vehicle, said mechanism including a double acting spring and pressure differential operated motor controlled by means including the accelerator of the vehicle and a vehicle speed responsive governor, said control means being such that a manipulation of the accelerator coupled with an operation of the governor effects an operation of the motor to shuttle the transmission between two of its settings.

A further object of the invention is to provide a compact, easily serviced and relatively simple double acting unit adapted for use in mechanism for operating the shiftable elements of the two-speed axle structure of an automotive vehicle.

The above and other objects and features of the invention will appear more fully hereinafter from a consideration of the following description taken in connection with the accompanying drawings, wherein one embodiment of the invention is illustrated by way of example.

Figure 3 is a sectional view disclosing details of the valve mechanism of my invention;

Figure 4 is a view disclosing the details of the governor operated switch of my invention.

The transmission operating power means constituting my invention is preferably employed to operate a two-speed axle transmission mechanism of an automotive vehicle; however, it may be employed to operate any power transmitting mechanism of the power plant of a land or marine vehicle wherein said mechanism is selectively movable to two operative positions.

Figure 1:
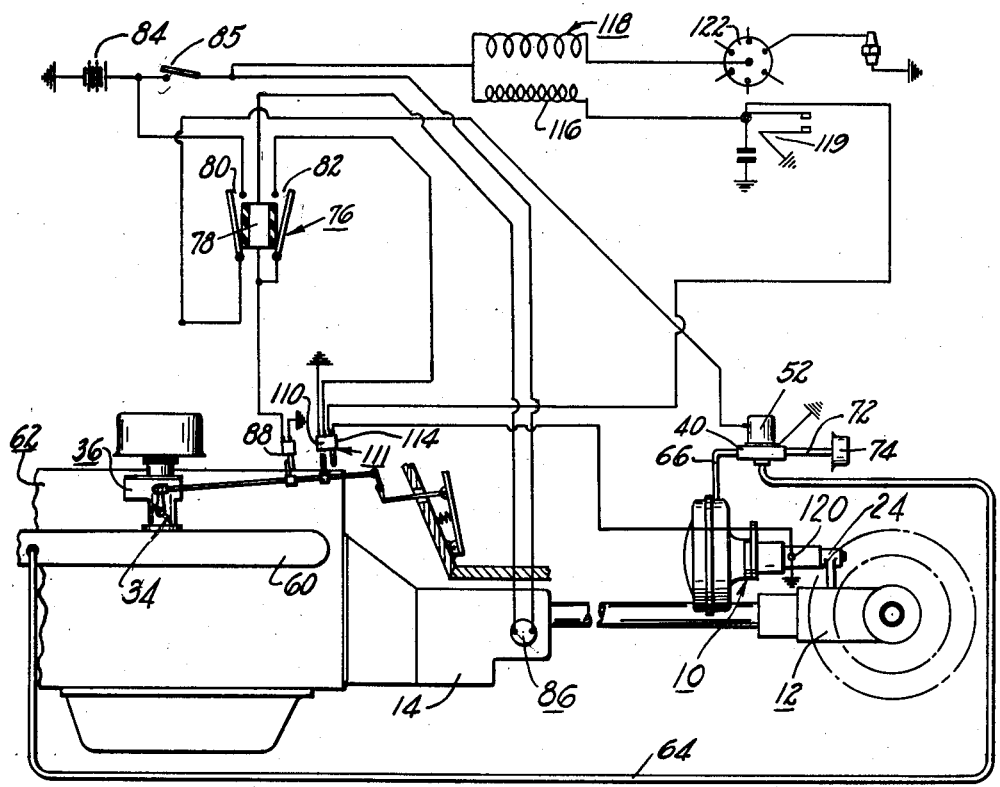
Figure 1 is a diagrammatic view of an automotive vehicle embodying the transmission operating mechanism of my invention.

Referring to Figure 1, a transmission operating power unit 10 is detachably mounted on the carrier of what is known in the automotive art as a two-speed axle, that is, a part of the driving mechanism of the vehicle effecting a gear ratio in addition to the usual driving ratio and different therefrom. This two-speed axle mechanism, actuated by the shifter mechanism of my invention, is indicated by the reference numeral 12, and a change speed transmission mechanism cooperating therewith is indicated by the reference numeral 14. The transmission operating mechanism constituting my invention may be employed to operate a Maybach clutch type of two-speed axle; however, any other well known two-speed axle construction is equally well operated by the mechanism of my invention.

Figure 2:
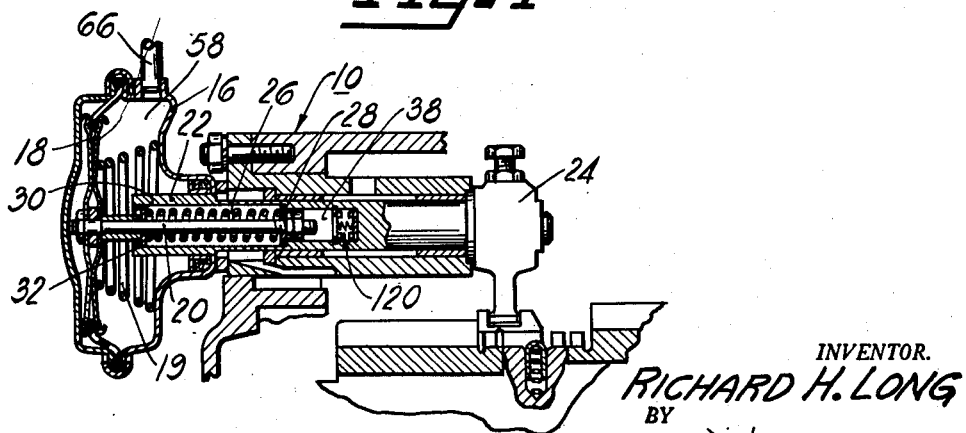
Figure 2 is a view disclosing the transmission operating vacuum motor of the invention.

There is disclosed in Figure 2 a preferred embodiment of the power unit 10 of the transmission operating mechanism of my invention, said unit including a two-part casing 16 housing a power element 18 which is secured to a stem 20. A spring 19 serves to bias the piston 18 to the left as disclosed in Figure 1 the transmission 12 being then established in its low gear setting. This stem is sleeved within a hollow rod 22 which is connected at its outer end to a shifting fork 24 of the two-speed axle mechanism 12. A preloaded spring 26, housed within the rod 22 and sleeved over the stem 20, abuts at one of its ends a stop washer 28 which is in abutment with a shoulder constituting a part of the rod 22; and the other end of the spring 26 abuts a stop washer 30 which is sleeved over the stem 20 and which is in abutment with a stop ring 32 secured to the other end of the hollow rod 22.

When the motor 10 is energized by the spring 19 to move the piston 18 to the left, Figure 2, the stem 20 is moved and with it the washer 28 on the end thereof. In this operation the spring 26 is further compressed by the expansion of the spring 19 to shorten its length; and it is to be noted that the motor 10 may be energized by the spring 19 before the torque load is taken off the transmission mechanism. Then when the torque of the engine is reversed, preferably as a result of a closing of the throttle 34 of the carburetor 36, Figure 1, the rod 22 will move to the left, Figure 2, under the load of the then compressed spring 26 to demesh the transmission; and after the two gears to be meshed are synchronized, the spring 26 continues its expansion to effect a new setting of the transmission.

Describing the high gear operation of the motor 10 when said motor is vacuum energized the piston 18 moves to the right, Figure 2, the end of the stem 20 moving within a recess 38 within the rod 22. In this operation the spring 26 is further compressed inasmuch as the distance between the washers 28 and 30 is shortened the washer 28 remaining stationary. Then as described above, when the engine torque is reversed and the synchronization of the gears has been effected, the spring 26 expands to effect the high gear setting of the transmission.

A solenoid operated three-way valve 40, Figure 3, is provided to control the operation of the motor 10. This valve, no claim to which is made, includes a two-part casing 42 said casing, together with a partition member 48, providing a compartment 44 and a compartment 46. The armature 50 of a grounded solenoid 52 serves to seat and unseat a valve member 54. When the solenoid is energized, to effect a high gear setting of the transmission, the member 54 is seated at 56 thereby connecting a compartment 58 of the motor 10 with the intake manifold 60 of the internal combustion engine 62 of the vehicle. The valve 40 is connected to the manifold by a conduit 64 and to the motor 10 by a conduit 66. When the solenoid 52 is de-energized, to effect a low gear setting of the transmission, a spring 68 operates to seat the valve 54 at 70 thereby venting the motor compartment 58 to the atmosphere via the conduit 66, a conduit 72 and an air cleaner 74.

The electrical means for controlling the valve operating solenoid 52 constitutes the most important feature of my invention, and includes a hold-down type of relay 76 comprising a coil 78 and normally open breaker switches 80 and 82. The coil is electrically connected in series with a grounded battery 84, the ignition switch 85 of the ignition system of the vehicle, a normally open breaker switch 86 and a normally closed accelerator operated breaker switch 88 which is opened when the accelerator is depressed to and beyond a certain position, say its one-fourth throttle open position. The switch 86 is preferably biased to its open position by a spring, not shown; and a vehicle speed responsive governor 91 serves to close the switch at a certain speed of the vehicle, say ten miles per hour. The normally open relay switch 80 is electrically connected in series with the battery 84 and the grounded valve operated solenoid 52.

Continuing the description of the electrical control means of my invention, the coil 78 of the relay 76 is also electrically connected in series with the battery 84, the ignition switch 85, the relay switch 82 and a normally closed and grounded kickdown switch 110 constituting part of an accelerator operated switch mechanism indicated by the reference numeral 111. The kickdown switch 110 is opened when the accelerator is depressed past its wide open throttle position and concurrent with the latter operation there is effected a closing of a normally open breaker switch 114 which also constitutes a part of the accelerator operated switch mechanism 111. The switch 114 is electrically connected in series with the primary winding 116 of the induction coil 118 of the vehicle and with a grounded breaker switch 120, Figure 1, which is normally open, but which is closed, preferably by the stem 20 of the motor 10, when the transmission is established in or is about to be established in its high gear setting. The induction coil 118, a grounded breaker switch 119 and a distributor 122 of a conventional ignition system of an automobile are diagrammatically disclosed in Figure 1 and with the mechanism of my invention the winding 116 is momentarily grounded by the closing of the accelerator operated kickdown switch 114 and the subsequent opening of the switch 120; and this operation serves to momentarily disable the engine of the vehicle, thereby facilitating the operation of the motor 10 in effecting the downshift, that is low gear operation of the transmission 12.

Describing now the complete operation of the mechanism of my invention, it will be assumed that the engine 62 of the vehicle is disconnected from the transmission 14 by the disengagement of the clutch, not shown, that said transmission is established in one of its settings, say its high gear setting, and that the two-speed axle 12 is established in its low gear setting. The driver of the vehicle will then re-engage the clutch and depress the accelerator to get the car under way.

Now when the speed of the vehicle reaches the aforementioned figure of 10 miles per hour the switch 86 will be closed thereby initiating an operation of the mechanism of my invention to establish a high gear setting of the transmission 12; for it will be assumed that the accelerator is at the time released to close the switch 88 thereby completing an electrical circuit including the relay coil 78; and this results in an energization of said coil. This operation will effect a closure of the switches 80 and 82, thereby effecting an energization of the valve operating solenoid 52. The throttle valve 34 is at the time closed to reverse the engine torque and the motor 10 is at the time vacuum energized to effect the high gear setting of the transmission. It is also to be noted that when the relay coil 78 is energized, the same remains energized until one or the other of switches 86 and 110 is broken.

Continuing the description of the operation of the mechanism of my invention, the transmission 12 will now remain in its high gear setting until the driver wills to establish a low gear setting thereof; and he may effect the latter operation, say to facilitate the passing of a car on the road, by depressing the accelerator past its wide open throttle position. This so-called kickdown operation effects an opening of the switch 110 and a closing of the switch 114, thereby momentarily interrupting the ignition system of the vehicle and de-energizing the solenoid 52 to operate the valve 40, Figure 3, to vent the motor 10 to the atmosphere. The latter operation initiates a spring energization of the motor, thereby effecting a low gear setting of the transmission, said operation being facilitated by the aforementioned momentary interruption, of the ignition system of the vehicle, that is, a momentary reversal of the engine torque. It is also to be noted that low gear operation of the transmission is automatically effected when the speed of the vehicle is decreased below governor speed which in the present instance is 10 M. P. H.

The transmission 12 now remains in its low gear setting until the vehicle speed is increased to the aforementioned critical factor, i. e., 10 M. P. H., and the accelerator is released sufficiently to close the switch 88; and as described above, when the switches 88 and 86 are closed, the mechanism is operative to establish the transmission 12 in its high gear setting.

There is provided a simple and efficient transmission operating mechanism for shuttling a transmission, i. e., a two-speed axle of an automotive vehicle, between two settings. With the mechanism of my invention, the driver operates but one control, that is the accelerator. The upshift operation of the mechanism is automatically effected when the accelerator is released to or beyond a certain position and the speed of the vehicle is increased to a certain factor; and the downshift operation of the mechanism of my invention is effected, at the will of the driver, by either depressing the accelerator to its wide open throttle position or by decreasing the vehicle speed to a certain factor.

I claim:

1. In an automotive vehicle provided with a change speed transmission, an accelerator, power means for operating the transmission including a motor, a valve for controlling the operation of the motor, and means for controlling the operation of the valve including a solenoid comprising an armature operably connected to the valve, and means for controlling the operation of the solenoid to effect an operation of the valve including a vehicle speed responsive governor, a switch, normally open, operated by the governor, a switch, normally closed, operated by the accelerator, a source of electricity, electrical means, including a relay coil, interconnecting the source of electricity and the two switches, and electrical means interconnecting the battery and solenoid including a normally open relay switch controlled by the operation of the relay coil.

2. In an automotive vehicle provided with a change speed transmission and an accelerator; power means for operating the transmission including a motor, a valve for controlling the operation of the motor, and means for controlling the operation of the valve including a grounded solenoid comprising an armature operably connected to the valve, and means for controlling the operation of the solenoid to effect an operation of the valve, said means including a vehicle speed responsive governor, a normally open switch operated by the governor, a normally closed switch operated by the accelerator, a source of electricity, an electrical relay mechanism comprising a coil and a normally open switch, electrical means interconnecting the source of electricity, the relay switch, and the solenoid, and electrical means interconnecting the source of electricity, the relay coil, the governor operated switch and the accelerator operated switch.

3. In an automotive vehicle provided with a change speed transmission, and an accelerator; power means for operating the transmission including a motor, a valve for controlling the operation of the motor, and means for controlling the operation of the valve including a grounded solenoid comprising an armature operably connected to the valve, and means for controlling the operation of the solenoid to effect an operation of the valve including a vehicle speed responsive governor, a normally open switch operated by the governor, a normally closed switch operably connected to the accelerator, a source of electricity, an electrical relay mechanism comprising a coil and a normally open switch, electrical means interconnecting the source of electricity, the relay coil, and the two switches, electrical means interconnecting the source of electricity, the relay switch and the solenoid, another normally open switch adapted to be actuated by the relay coil, a grounded accelerator operated kick-down switch, and electrical means interconnecting the relay coil, the last mentioned relay switch and the accelerator operated kick-down switch.

4. In an automotive vehicle provided with an ignition system, a change speed transmission, and an accelerator; power means for operating the transmission including a motor, a valve for controlling the operation of the motor, and means for controlling the operation of the valve including a grounded solenoid comprising an armature operably connected to the valve, and means for controlling the operation of the solenoid to effect an operation of the valve including a vehicle speed responsive governor, a switch operated by the governor, a switch operated by the accelerator, a source of electricity, an electrical relay mechanism comprising a coil and a normally open switch, electrical means interconnecting the source of electricity, the relay switch and the solenoid, electrical means interconnecting the source of the electricity, the relay coil, the governor operated switch and the accelerator operated switch, another normally open switch adapted to be actuated by the relay coil, a grounded accelerator operated kick-down switch, electrical means interconnecting the relay coil, the last mentioned relay switch and the accelerator operated kick-down switch, and means, including a kick-down switch actuated by the accelerator, a switch operably connected to the power element of the motor, and electrical means interconnecting a part of the ignition system and the latter two switches, for momentarily disabling the ignition system to facilitate a certain operation of the transmission by the power means.

5. In an automotive vehicle provided with an ignition system, a change speed transmission and an accelerator; power means for shuttling the transmission between two of its settings including a motor having its power element operably connected to the transmission, a valve for controlling the operation of said motor, means for automatically operating the valve including a grounded solenoid, and means for operating the solenoid including a relay mechanism comprising a coil and two normally open switches operated by the coil, a source of electricity, electrical means interconnecting the solenoid, one of the relay switches and the source of electricity, a grounded accelerator operated switch, electrical means interconnecting the source of electricity, the coil and the accelerator operated switch, another accelerator operated switch, and electrical means interconnecting the other relay switch, the coil and the second mentioned accelerator operated switch; together with means operated in part by the accelerator, for momentarily disabling the ignition system to facilitate an operation of the power means in effecting one of the settings of the transmission.

6. In an automotive vehicle including a change speed transmission, an accelerator and ignition system, power means for shuttling the transmission between two of its settings comprising a spring and pressure differential operated motor operably connected to the transmission, valve means for controlling the operation of the motor, a vehicle speed responsive governor, electrical means for operating the valve means including, in series, an accelerator operated switch, a switch operated by the governor and a source of electricity, said electrical means being operative, when the accelerator is released to or beyond a certain position and the speed of the vehicle is increased to a certain factor, to effect an operation of the valve means to in turn effect a certain setting of the transmission; together with means operative, when the accelerator is depressed to or beyond a certain position, to effect an operation of the electrical means to in turn effect another setting of the transmission the ignition system of the vehicle being temporarily disabled to facilitate the latter operation of the transmission.

RICHARD H. LONG.

REFERENCES CITED

The following references are of record in the file of this patent:

UNITED STATES PATENTS

| Number | Name | Date |
|---|---|---|
| 1,911,599 | Bloxsom | May 30, 1933 |
| 2,322,479 | Schjolin | June 22, 1943 |
| 2,380,677 | Schjolin | July 31, 1945 |
| 2,440,558 | Price | Apr. 27, 1948 |
| 2,454,614 | Peterson et al. | Nov. 23, 1948 |
| 2,492,923 | Moore et al. | Dec. 27, 1949 |